(12) United States Patent  
Graetz et al.

(10) Patent No.: US 7,521,037 B1  
(45) Date of Patent: Apr. 21, 2009

(54) REGENERATION OF ALUMINUM HYDRIDE

(75) Inventors: Jason Allan Graetz, Mastic, NY (US); James J. Reilly, Bellport, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 0 days.

(21) Appl. No.: 11/831,297

(22) Filed: Jul. 31, 2007

Related U.S. Application Data

(60) Provisional application No. 60/834,521, filed on Aug. 1, 2006.

(51) Int. Cl.  
*C01B 6/06* (2006.01)

(52) U.S. Cl. .................................................... 423/645

(58) Field of Classification Search ............... 423/645  
See application file for complete search history.

(56) References Cited

U.S. PATENT DOCUMENTS

| | | | |
|---|---|---|---|
| 3,453,089 A | | 7/1969 | Del Giudice |
| 3,642,853 A | * | 2/1972 | Murib et al. ............... 556/176 |
| 3,651,064 A | | 3/1972 | Nelson et al. |
| 3,664,811 A | * | 5/1972 | Scruggs ..................... 423/645 |
| 3,843,774 A | * | 10/1974 | York et al. ................. 423/645 |
| 6,471,935 B2 | | 10/2002 | Jensen et al. |
| 2001/0038821 A1 | * | 11/2001 | Petrie et al. ............... 423/645 |

OTHER PUBLICATIONS

Wang, et al., "Physiochemical Pathway for Cyclic Dehydrogenation and Rehydrogenation of LiAlH$_4$," *J. Am. Chem. Soc.*, 128: 5949-5954 (2006).  
Birnbaum, et al., "Hydrogen in Aluminum", *J. of Alloys and Compounds*, 253-254: 260-264 (1997).  
Konovalov, et al., "The P,T-State Diagram and Solid Phase Synthesis of Aluminium Hydride", *Inorg. Chem.*, 34: 172-175 (1995).  
Baranowski, et al., "The Equilibrium Between Solid Aluminium Hydride and Gaseous Hydrogen", *Phys. Chem.*, 135: 27-38 (1983).  
Brower, et al., "Preparation and Properties of Aluminum Hydride", *J. Am. Chem. Soc.*, 98: 2450-2453 (1976).  
Ashby, E.C., "The Direct Synthesis of Amine Alanes", *J. Am. Chem. Soc.*, 86: 1882-1883 (1964).  
Finholt, et al., "Lithium Aluminum Hydride, Aluminum Hydride and Lithium Gallium Hydride, and Some of their Applications in Organic and Inorganic Chemistry", *J. Am. Chem. Soc.*, 69: 1199-1203 (1947).

* cited by examiner

*Primary Examiner*—Wayne Langel  
(74) *Attorney, Agent, or Firm*—Dorene M. Price

(57) ABSTRACT

The present invention provides methods and materials for the formation of hydrogen storage alanes, AlH$_x$, where x is greater than 0 and less than or equal to 6 at reduced H$_2$ pressures and temperatures. The methods rely upon reduction of the change in free energy of the reaction between aluminum and molecular H$_2$. The change in free energy is reduced by lowering the entropy change during the reaction by providing aluminum in a state of high entropy, by increasing the magnitude of the change in enthalpy of the reaction or combinations thereof.

25 Claims, 3 Drawing Sheets crystalline Al  
(ordered)

solvated Al  
(disordered)

REGENERATION OF ALUMINUM HYDRIDE

PARENT CASE

This application claims benefit of U.S. provisional application No. 60/834,521, filed Aug. 1, 2006, the entirety of which is incorporated herein by reference.

The present invention was made with government support under Contract No. DE-AC02-98CH10886 awarded by the U.S. Department of Energy. The United States government has certain rights in the invention.

BACKGROUND OF THE INVENTION

The future of hydrogen as an energy source is dependent upon the development of storage media with high volumetric and gravimetric capacities. Hydrogen storage has been identified as the bottleneck in the development of hydrogen-fueled vehicles. Conventional storage methods (e.g. compressed gas and liquid $H_2$) will likely be inadequate for automotive applications due to issues of safety, volumetric $H_2$ capacity and cost. An alternative to these more traditional methods is to store the hydrogen in the solid state. This can be accomplished with adsorbents (e.g. carbon), where hydrogen is attached to the surface of a solid, or absorbents (e.g. metal hydrides), where hydrogen is inserted in between the atoms in a solid. The key requirements for any candidate hydrogen storage material in automotive applications are high gravimetric and volumetric hydrogen densities, a release of hydrogen at moderate temperatures and pressures, and a low-cost method to recharge the material back to its original state. The US Department of Energy (US DOE) hydrogen storage system goals for the year 2010 are a 6.0 weight percent (6.0 wt %) gravimetric capacity and a volumetric capacity of 0.045 kg/L. Conventional metal hydrides that can readily supply hydrogen at room temperature have storage capacities <2 wt % and therefore cannot satisfy these goals.

Aluminum hydride, $AlH_3$, is an attractive alternative to the traditional metal hydrides. It has a volumetric hydrogen capacity (1.48 kg/L) greater than that of liquid hydrogen and a gravimetric hydrogen capacity exceeding 10 wt %. $AlH_3$ is stable at room temperature despite an equilibrium hydrogen pressure of around $5\times10^5$ bar at 298K [1]. In general, the rapid low temperature kinetics and high energy density make $AlH_3$ an unusual and promising hydrogen storage medium for a number of applications.

However, the conventional organometallic synthesis is a costly procedure and $AlH_3$ is not a reversible hydride at moderate $H_2$ pressures. Incorporating dopants or catalytic additives is not likely to produce the large thermodynamic changes required to substantially reduce the equilibrium pressure. Therefore, the utility of this material will depend upon the development of techniques to regenerate $AlH_3$ from the spent Al powder in a cost effective and energetically efficient manner. The present invention addresses methods to regenerate alanes $(AlH_x)$ from Al by decreasing the change in free energy during the hydrogenation reaction.

There have been a few prior attempts to hydrogenate Al to form $AlH_x$. Baranowski and Tkacz claimed to form $AlH_3$ from Al metal using high-pressure hydrogen (28 kbar) at 300 C. [2], however this pressure is much too low in view of the free energy of formation for $AlH_3$ via the direct reaction of Al metal with $H_2$ gas. Although this method is the most direct ($AlH_3$ is formed from crystalline Al and $3/2H_2$), the $H_2$ pressures required are much too large to be practical for any application (28 kbar is approximately thirty times the pressure at the bottom of the Mariana Trench, 11 km below sea level).

Birnbaum et al. [3] have made attempts to hydrogenate Al by electrochemical charging, chemical charging and by exposure to an ultrasonic field. These experiments resulted in small amounts of hydrogen uptake by the Al with concentrations of less than 2500 atomic parts per million (one quarter of 1% H in Al). These methods are costly, inefficient and do not form $AlH_x$ in high enough yields to make it a practical hydrogen fuel source.

The conventional wet chemistry procedure for synthesizing $AlH_3$ is through an ethereal reaction of an alkali alanate (e.g. $LiAlH_4$, $NaAlH_4$) with aluminum chloride ($AlCl_3$) [4] as shown in reaction (1):

$$AlCl_3 + 3LiAlH_4 + n[(C_2H_5)_2O] \rightarrow 4AlH_3 \cdot 1.2[(C_2H_5)_2O] + 3LiCl \quad (1)$$

A non-solvated form of $AlH_3$ was initially prepared by Chizinsky et al. [5] and subsequently by Brower et al. [6] by heating in the presence of a complex metal hydride under reduced pressure. The synthesis was extremely sensitive to the desolvation conditions (e.g. temperature and time) and small alterations lead to the precipitation of different $AlH_3$ polymorphs. $\gamma$-$AlH_3$ formed in the presence of excess $LiAlH_4$, while $\beta$-$AlH_3$ formed in the presence of excess $LiAlH_4$ and $LiBH_4$ [5]. In both cases, a slightly higher temperature (70 C.) and/or a longer heating time lead to the formation of $\alpha$-$AlH_3$. Although this procedure can be used to make pure $AlH_3$, the cost of the starting materials ($LiAlH_4$ and $AlCl_3$) would be too high for widespread applications of $AlH_3$ as a hydrogen storage material.

The present invention introduces new methods for regeneration of $AlH_x$ at reduced $H_2$ gas pressures and temperatures through consideration of and adjustment for basic principles of the thermodynamics of the regeneration reaction.

DETAILED DESCRIPTION OF THE INVENTION

The present invention involves a method to form $AlH_x$ from Al at a reduced $H_2$ gas pressure (<28 kbar at 30° C.). This method operates by lowering the change in free energy that occurs during the hydrogenation reaction. One method includes using Al in a state of high entropy to lower the entropy change during hydrogenation. Another method involves using an alloy or Al compound to increase the magnitude of the enthalpy change of hydrogenation. A reduction in the entropy change, and/or an increase in the magnitude of the enthalpy change, lowers the total free energy change and thereby reduces the hydrogen equilibrium pressure. Because the hydrogen equilibrium pressure scales exponentially with the free energy, small changes in the free energy will result in large changes in the minimum $H_2$ pressure required to form $AlH_x$.

This invention consists of a method to form alane, $AlH_x$ (where 0<x<6), from Al and $H_2$ gas. In this method, the $H_2$ equilibrium pressure ($H_2$ pressure required for hydrogenation) is reduced by lowering the total free energy of hydrogenation. In a preferred embodiment of the present invention x=3 and the resultant alane is $AlH_3$. In various embodiments of the present invention, the $H_2$ pressure required for hydrogenation is less than or equal to 28 kbar at 300 C. In various embodiments of the present invention the required $H_2$ pressure varies from 1 bar to 28 kbar, or from 1 bar to 25 kbar, or from 100 bar from 19 kbar, or from 1 kbar to 10 kbar. The hydrogenation of Al by $H_2$ gas occurs when the pressure of the gas is above the equilibrium $H_2$ pressure ($P_{eq}$), which is given by equation (2):

$$P_{eq} = \exp[2\Delta G/xRT], \qquad (2)$$

where $\Delta G$ is the change in the Gibbs free energy (in units of moles AlHx), x is the molar ratio H/Al, R is the molar gas constant (R=8.314 J/mol K) and T is the temperature. In the hydrogenation reaction, the change in the Gibbs free energy is given by:

$$\Delta G = \Delta H - T\Delta S \qquad (3)$$

where $\Delta H$ and $\Delta S$ are the enthalpy and entropy of the reaction, respectively. Combining equations 2 and 3 gives the relationship between the $H_2$ equilibrium pressure (the minimum pressure required for hydrogenation) and the entropy change:

$$P_{eq} = \exp\left[\frac{2}{xRT}(\Delta H - T\Delta S)\right]. \qquad (4)$$

Figure 1:
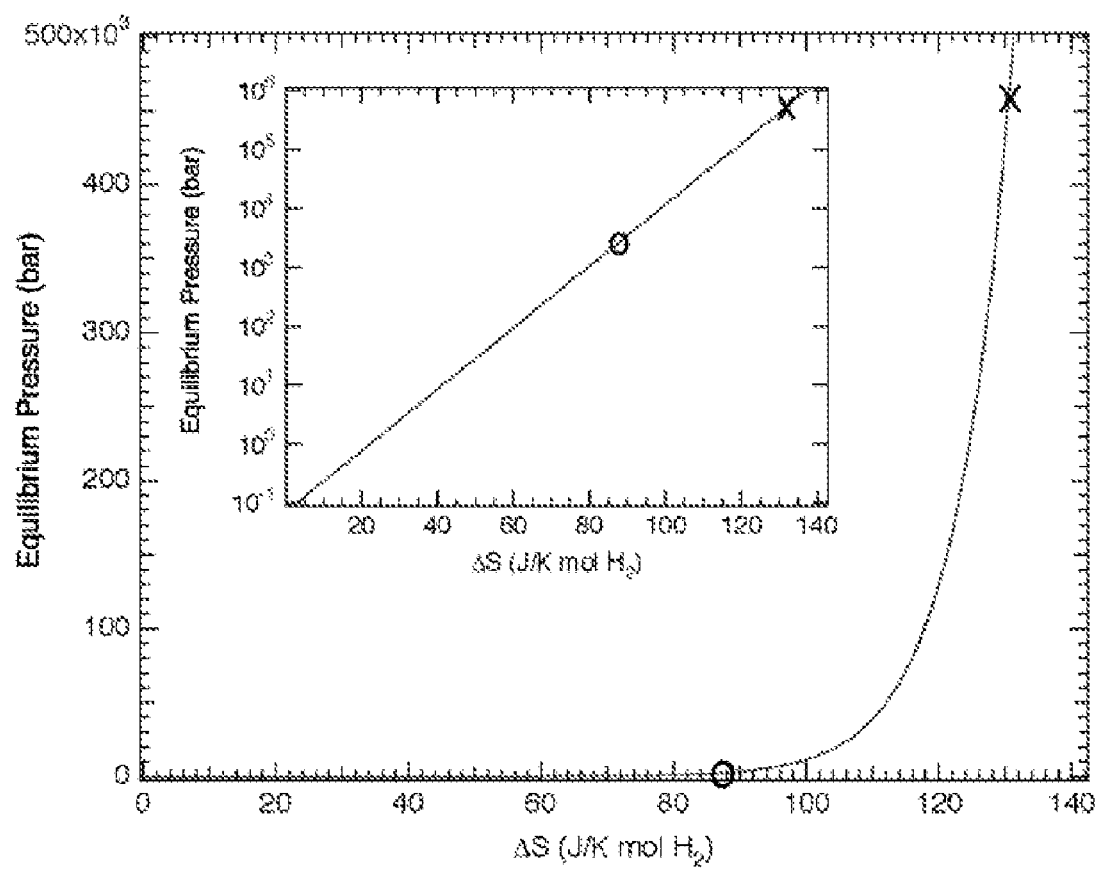
FIG. 1. Equilibrium $H_2$ pressure at 298 K as a function of $\Delta S$ calculated from equation 4. The x markers indicate the pressure for the standard entropy of $H_2$ gas (130.7 kJ/K mol $H_2$), while the o markers represent a 33% reduction in $\Delta S$ (88 kJ/K mol $H_2$).

Equation (4) is plotted in FIG. 1 using x=3 (for $AlH_3$), T=298 K (room temperature) and $\Delta H$=−9.9 kJ/mol $AlH_3$ [6]. This plot clearly demonstrates how a small decrease in the entropy change corresponds to a large reduction in the equilibrium pressure. For example, a reduction of $\Delta S$ by 33% lowers the equilibrium pressure by more than two orders of magnitude. Similarly, a small increase in the magnitude of the enthalpy of hydrogenation will significantly reduce the $H_2$ equilibrium pressure.

Figure 2:
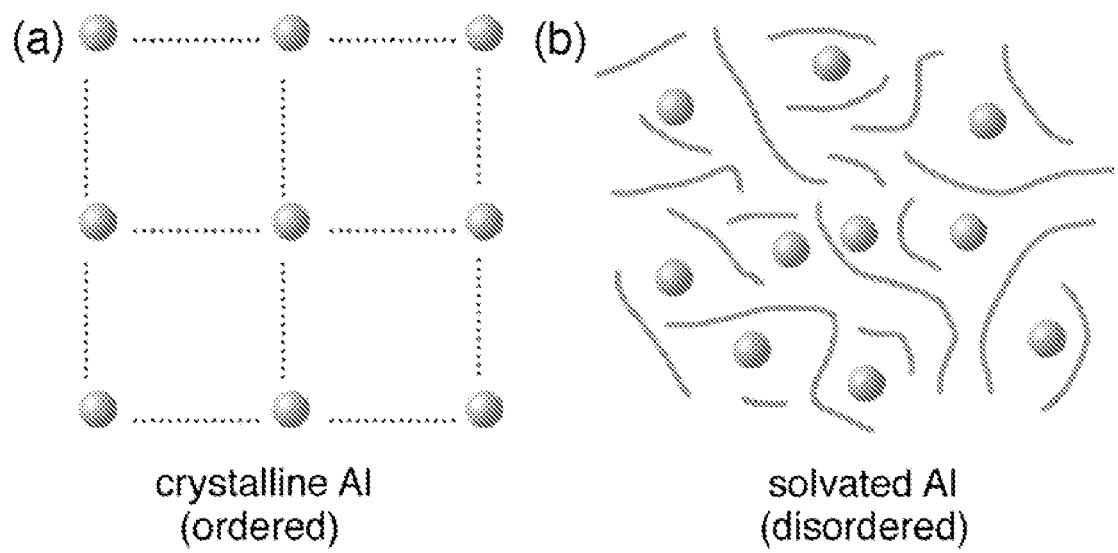
FIG. 2. Schematic representation of Al (a) as a crystalline solid and (b) as a solvated species in the liquid or solid state.

The $H_2$ equilibrium pressure can be significantly reduced decreasing the entropy difference between the initial state before hydrogenation: Al (in some form)+$H_2$ (gas) and the final state after hydrogenation: $AlH_x$. The entropy of any system can be described by Boltzmann's epitaph, equation (5):

$$S = k_B \ln(W), \qquad (5)$$

where $k_B$ is the Boltzmann constant and W is the number of different equivalent configurations of the system. The entropy of a solid contains contributions from configurational, electronic, vibrational, and other components. When Al is in its common crystalline form (face centered cubic) each Al atom occupies a lattice site that is energetically equivalent to all other lattice sites (FIG. 2a). In this case, the entropy is low because there is essentially only one site available to each atom. However, in a system where the atoms have more vibrational and rotational freedom, they lack the long-range order of a crystal, as in FIG. 2b. In this case the entropy is high because there are many different energetically equivalent states available for a given Al atom. The entropy change that occurs when a H atom is taken from a gas (where a large number of equivalent configurations are available) and put into an ordered solid is typically large. However it may be possible to lower this entropy change upon hydrogenation by starting with Al in a state of high entropy rather than in a crystalline form. Al can be prepared in such a state in a number of ways, such as an amorphous metal, a collection of nanoparticles, or by dissolving Al or an ionic Al compound (e.g. $AlCl_3$) in a solvent (e.g. diethyl ether, THF, toluene, benzene, etc.).

Increasing the magnitude of $\Delta H$ can also reduce the change in free energy during hydrogenation and thereby decrease the $H_2$ equilibrium pressure. One method to make $\Delta H$ more negative is by including additional metal atoms to form a more stable hydride. The formation enthalpy of $AlH_3$ is −9.9 kJ/mol $AlH_3$. However, this value can be made more negative by introducing a metal atom M at a molar concentration, n, to stabilize the hydride ($AlM_nH_x$). This method is commonly used in conventional metal hydrides to destabilize the system and increase the $H_2$ equilibrium pressure. Typically, M is a metal atom that does not form a stable hydride, such as iron. By contrast, the present invention makes use of the reverse application, i.e., using a metal that forms a stable hydride (e.g. Ti) to increase the magnitude of $\Delta H$ and lower the $H_2$ equilibrium pressure.

Figure 3:
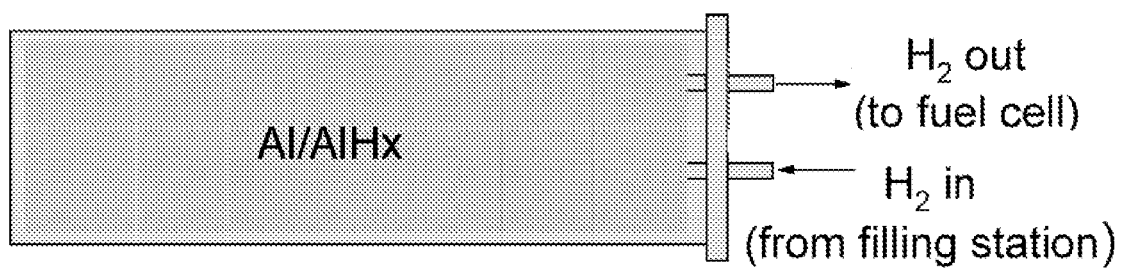
FIG. 3. Schematic example of a hydrogenation vessel.

The present invention can be used in a variety of ways for a number of different applications. The common theme among these applications is the hydrogenation of disordered Al using $H_2$ gas. One form of this invention includes the direct hydrogenation of Al dissolved in a solvent (liquid state) or solvated Al (solid state). The hydrogenation may be performed on-board (with the storage vessel still attached to the vehicle/device) or off-board (separate from the vehicle/device). The hydrogenation vessel will likely need to withstand high pressures of $H_2$ gas. A schematic example of a hydrogenation vessel is shown in FIG. 3.

Other forms of this invention involve the hydrogenation of dissolved Al (as a liquid or solid) followed by the removal of the solvent to form one of the crystalline phases of $AlH_3$ ($\alpha$, $\alpha'$, $\beta$, $\gamma$, $\delta$, $\epsilon$, $\zeta$). Although this method requires the extra step of solvent removal, typically performed by heating in the presence of a complex metal hydride under reduced pressure, the final product will have greater gravimetric capacity (~10 wt %) due to the removal of the solvent molecules.

A preferred embodiment of the present invention applies new methods to form $AlH_3$ from Al and $H_2$ gas at reduced $H_2$ pressures and temperatures. However, another embodiment the methods of the invention can be used to generate the complex alanates, many of which may be useful for hydrogen storage applications. Similar to $AlH_3$, a number of alanates are metastable or unstable at room temperature (e.g. $LiAlH_4$, $Ti(AlH_4)_4$) and can not be regenerated using moderate $H_2$ gas pressures. Therefore, lowering the free energy change (by decreasing the entropy change and/or increasing the magnitude of the enthalpy) during hydrogenation may significantly reduce the $H_2$ equilibrium pressures.

There are likely to be a number of different methods to lower the free energy change associated with the hydrogenation reaction. This can be accomplished by lowering the entropy change by using Al in a system where it has high entropy. A few examples of such systems are dissolved Al in a liquid phase, an Al polymer, an amorphous Al solid, a solvated Al solid, Al nanoparticles suspended in an inert matrix.

Two embodiments for the alteration of $\Delta H$ are relevant. As noted in equation 4, $\Delta H$ also influences $\Delta G$ and as the overall reaction(s) become more exothermic, $\Delta G$ becomes more negative and $P_{eq}$ is reduced. In conventional metal hydrides an embodiment involves introducing another metal component in part for the original metal in order to reduce or increase the equilibrium pressure. Such a substitution may also be useful in the present instance.

The other embodiment involves the reaction of the dissolved $AlH_3$ species with a solvent molecule to form a solvated $AlH_3$ moiety. Such solvated species are known to occur, e.g. $AlH_3$ forms a solvated ether bond. In this case, the heat of solvation ($\Delta H_s$) would also tend to the lower the equilibrium pressure.

REFERENCES

[1] J. Graetz and J. Reilly J. Alloys Comp. In press (2006).
[2] Baranowski, B.; Tkacz, M. Z. Phys. Chem. 135 27. (1983).
[3] H. K. Birnbaum, C. Buckley, F. Zeides, E. Sirois, P. Rozenak, S. Spooner, J. S. Lin, J. Alloys Comp. 253 260 (1997).
[4] Finholt, A. E.; Bond, Jr., A. C.; Schlesinger H. I. J. Am. Chem. Soc. 69 1199 (1947).
[5] Chizinsky, G.; Evans, G. G.; Gibb Jr, T. R. P.; Rice Jr, M. J. J. Am. Chem. Soc., 77 3164 (1955).
[6] Brower, F. M.; Matzek, N. E.; Reigler, P. F.; Rinn, H. W.; Roberts, C. B.; Schmidt, D. L.; Snover, J. A.; Terada K. J. Am. Chem. Soc., 98 2450 (1976).

METHODS OF THE INVENTION

EXAMPLE 1

Embodiments of the present invention present new methods for hydrogenation of aluminum or an aluminum species in the presence of a reactive solvent to form aluminum hydride ($AlH_x$ where x is greater than 0 and less or equal to 6) or an aluminum hydride adduct. The hydrogenation occurs by exposing the reactants to high-pressure hydrogen gas. The reactants include Al or an Al compound and a solvent. The methods may include:

(1) Preparing solvated Al: Al is introduced into the solvent in the form of bulk powder, activated powder, nanostructured/nanoscale Al or as an aluminum halide ($AlF_3$, $AlCl_3$, $AlBr_3$). Activated aluminum is prepared by the decomposition of previously prepared $AlH_3$. In preferred embodiments, the solvent is selected from a number of non-aqueous solvents containing amine groups, amide groups, hydroxyl groups, or any of the oxygen-based solvents such as dibutyl ethers and ketones. Specific solvents may include, without limitation, diethyl ether, tetrahydrofuran (THF), dibutyl ether, triethylamine, ethylenediamine, ethylene glycoldimethylether, diethylethylene diamine, and triethyl Al. In the latter case, Al is already present and need not be introduced.

(2) Hydrogenation: The solvated Al is hydrogenated under $H_2$ gas at pressures less than 10,000 psi and temperatures less than 500 C. The solvated Al may be in a liquid, a solid or semi-solid form. The reactants may be stirred or agitated to enhance the rate of hydrogen uptake. Although a catalyst is not necessary, a catalyst may enhance the rate of hydrogenation. Appropriate catalysts may be selected from transition metals (e.g., Ti, V, Fe, Co, Ni, Pd, etc.) or transition metal compounds (e.g., $TiCi_2$, $TiF_3$, $C_{16}H_{36}O_4Ti$, $ZrCl_3$, etc.).

(3) Desolvation: Optionally the solvent may be removed from the $AlH_x$ by vacuum drying at temperatures between 30 and 90 C. This process may be enhanced when a desolvating species is present such as a complex metal hydride ($LiAlH_4$, $LiBH_4$) or a metal halide (e.g., LiCl). The desolvating species can be removed with a solvent that preferentially dissolves the desolvating species over the metal hydride. The desolvating species can also be removed with a solvent that preferentially dissolves the metal hydride over the desolvating species (see U.S. Pat. No. 3,453,089 to Guidice, the contents of which are incorporated herein by reference). After removal the desolvating species can be recovered for further use.

In other embodiments it is preferred that the solvent remain present and therefore the desolvation step is not practiced. In this embodiment, hydrogen can be added and removed reversibly from the solvated $AlH_x$, which can exist as a liquid or solid.

The class of solvent-assisted hydrogenation reactions described herein are used to produce amine alane from the mixture of THF, activated Al powder and triethylenediamine under 500 psi $H_2$ pressure at 70 C. (Ashby, E. C., J. Amer. Chem. Soc. 86: 1882 (1964)).

Other specific embodiments include:

A. Activated Al powder+THF+$H_2$→$AlH_3$.THF (similar to the methods described by Wang et al. (J. Amer. Chem. Soc. 128: 5949 (2006)) for $LiAlH_4$).

B. $AlCl_3$+$Et_2O$+3/2$H_2$→$AlH_3$.$Et_2O$+HCl↓→$AlH_3$+$Et_2O$→

C. $AlH_3$+THF→$AlH_3$.THF$\Delta$→$AlH_y$.THF (where 0<y<3).

EXAMPLE 2

The hydrogenation of Al may also be assisted by a low concentration (≦4 mol %) of other additives such as catalysts or dopants. Such additives may include, but are not limited to elements from the 3d and 4d transition metal series. These additives may be introduced in the metallic state (e.g., Ti, Ni) or as compounds such as a metal salt (e.g., $TiCl_3$). The purpose of the low concentration of additive is to enhance the total quantity of hydrogen absorbed and desorbed and to increase hydrogenation-dehydrogenation reaction rates.

EXAMPLE 3

In one example of use of additives, 15/4 g of Triethylenediamine (TEDA) was dissolved in 90 mL tetrahydrofuran (THF). Approximately 1.5 g of Al powder with 2 mol % Ti was added to this solution in a stirred high-pressure reactor. Hydrogen gas was added to the reactor (520 psia) and the solution was stirred at approximately 500 rpm. At room temperature (23 C.) hydrogenation occurred immediately and was approximately complete after 3 hours. In the absence of Ti to create Ti-activated Al metal, under similar reaction conditions there was no apparent hydrogenation even at approximately three-fold higher pressures.

During hydrogenation of the Ti-activated Al metal, a white/gray solid of TEDA-AlH3 precipitated out of solution. The solid reaction products were analyzed using powder X-ray diffraction. The analysis showed that no trace of the original Al or TEDA was present, confirming the reaction went to completion. Other experiments performed with dodecane in place of THF showed similar results (with equilibrium pressures of 32-40 psia at 86 C.) demonstrating the reaction with Ti-activated Al proceeds in non-polar as well as polar solvents. It is likely that other amine compounds exist that will react with the catalyzed (Ti-activated) Al to form reversible amine alanes.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A method of preparing alane, $AlH_x$, where x is greater than 0 and less than or equal to 6, at substantially reduced $H_2$ gas pressure by reducing the change in free energy of reaction between Al and molecular hydrogen comprising the steps of:
   a) providing Al in a state of high entropy;
   b) exposing said Al to gaseous $H_2$ under conditions appropriate for the reaction between the $H_2$ and the Al;
   c) allowing the reaction to proceed; and
   d) isolating the alane resulting from the reaction,
wherein Al in a state of high entropy is disordered Al.

2. The method according to claim 1 wherein the change in free energy is reduced by lowering the change in entropy associated with the reaction between Al and molecular hydrogen.

3. The method according to claim 2 wherein the change in entropy is lowered by providing Al in a state of high configurational entropy.

4. The method according to claim 3 wherein the Al is provided in a liquid phase.

5. The method according to claim 3 wherein the Al is provided in a polymer form.

6. The method according to claim 3 wherein the Al is provided in an amorphous solid phase.

7. The method according to claim 3 wherein the Al is provided as a solvated solid.

8. The method according to claim 7 wherein the solvent is a nonaqueous solvent.

9. The method according to claim 8 wherein the solvent contains amine, amide or hydroxyl groups.

10. The method according to claim 8 wherein the solvent is an oxygen-based solvent such as ethers and ketones.

11. The method according to claim 10 wherein the solvent is selected from the group consisting of diethyl ether, tetrahydrofuran, dibutyl ether, and ethylene glycoldimethylether.

12. The method according to claim 3 wherein the Al is provided in nanoparticulate form in an inert matrix.

13. The method according to claim 1 wherein the change in free energy is reduced by increasing the magnitude of the change in enthalpy ($\Delta H$) associated with the reaction between Al and molecular hydrogen.

14. The method according to claim 13 wherein the $\Delta H$ magnitude is increased by introducing a metal atom (M) at a molar concentration, n, to stabilize a hydride formed between Al, M and hydrogen.

15. The method according to claim 14 wherein the metal (M) forms a stable hydride.

16. The method according to claim 1 wherein the change in free energy is reduced by a combination of lowering the change in entropy of the reaction between Al and molecular hydrogen and increasing the magnitude of the change in enthalpy of the reaction between Al and molecular hydrogen.

17. The method according to claim 7 wherein the solvent is removed from the alane by vacuum drying.

18. The method according to claim 17 wherein the vacuum drying is carried out at temperatures ranging from 30 to about 90 C.

19. The method according to claim 1 wherein $x=3$.

20. The method according to claim 19 wherein the $H_2$ gas pressure is less than or equal to about 28 kbar.

21. The method according to claim 20 wherein the $H_2$ pressure is from 1 bar to 25 kbar.

22. The method according to claim 21 wherein the $H_2$ pressure is from 1 bar to 20 kbar.

23. The method according to claim 22 wherein the $H_2$ pressure is from 10 bar to 10 kbar.

24. The method according to claim 23 wherein the $H_2$ pressure is from 100 bar to 10 kbar.

25. The method according to claim 24 wherein the $H_2$ pressure is from 1 kbar to 10 kbar.

* * * * *